United States Patent
Luce et al.

(10) Patent No.: US 11,766,723 B2
(45) Date of Patent: Sep. 26, 2023

(54) TAIL STOCK FOR A LONG VERTICALLY SUSPENDED WORKPIECE THAT WILL EXPERIENCE HEAT EXPANSION

(71) Applicants: David K. Luce, Splendora, TX (US); Crystal A. Parrott, Helotes, TX (US); Stephen L. Wiedmann, Boerne, TX (US)

(72) Inventors: David K. Luce, Splendora, TX (US); Crystal A. Parrott, Helotes, TX (US); Stephen L. Wiedmann, Boerne, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 108 days.

(21) Appl. No.: 17/474,490

(22) Filed: Sep. 14, 2021

(65) Prior Publication Data

US 2021/0402484 A1      Dec. 30, 2021

Related U.S. Application Data

(62) Division of application No. 16/556,547, filed on Aug. 30, 2019, now Pat. No. 11,198,183, which is a
(Continued)

(51) Int. Cl.
*B23B 23/00*      (2006.01)
*B23B 23/04*      (2006.01)
(Continued)

(52) U.S. Cl.
CPC .............. *B23B 23/00* (2013.01); *B05B 3/001* (2013.01); *B05B 7/16* (2013.01); *B05B 12/124* (2013.01);
(Continued)

(58) Field of Classification Search
CPC ......... B23B 23/00; B23B 1/00; B23B 23/045; B23B 2260/128; B05B 3/001; B05B 7/16;
(Continued)

(56) References Cited

U.S. PATENT DOCUMENTS

| 1,318,223 A | 10/1919 | Muller |
| 1,689,410 A | 10/1928 | Steiner |

(Continued)

FOREIGN PATENT DOCUMENTS

| DE | 669632 C | 12/1938 |
| DE | 1124322 B | 2/1962 |

(Continued)

OTHER PUBLICATIONS

Effect of the cutting condition and the reinforcement phase on the thermal load of the workpiece when dry turning aluminum metal matrix composites, Aurich et al., Jul. 3, 2015. (Year: 2015).*

*Primary Examiner* — Jacques M Saint Surin
(74) *Attorney, Agent, or Firm* — CANTOR COLBURN LLP

(57) ABSTRACT

A method of processing a workpiece includes supporting the workpiece on a tailstock extending along an axis, thermally processing the workpiece with a processing device, and displacing a portion of the tailstock assembly in response to thermal expansion of the workpiece as a result of processing with the thermal processing device.

7 Claims, 4 Drawing Sheets

Related U.S. Application Data division of application No. 15/185,541, filed on Jun. 17, 2016, now abandoned.

(51) Int. Cl.

| | |
|---|---|
| *C23C 4/00* | (2016.01) |
| *B23B 1/00* | (2006.01) |
| *B05B 12/12* | (2006.01) |
| *B05B 13/02* | (2006.01) |
| *B05B 7/16* | (2006.01) |
| *B05B 3/00* | (2006.01) |
| *B22F 3/115* | (2006.01) |
| *G01N 29/265* | (2006.01) |
| *B22F 3/10* | (2006.01) |

(52) U.S. Cl.
CPC .............. *B05B 13/02* (2013.01); *B22F 3/115* (2013.01); *B23B 1/00* (2013.01); *B23B 23/045* (2013.01); *C23C 4/00* (2013.01); *G01N 29/265* (2013.01); *B22F 3/10* (2013.01); *B23B 2260/128* (2013.01)

(58) Field of Classification Search
CPC ....... B05B 12/124; B05B 13/02; B22F 3/115; B22F 3/10; C23C 4/00; G01N 29/265
USPC .......................................................... 82/118
See application file for complete search history.

(56) References Cited

U.S. PATENT DOCUMENTS

| | | | |
|---|---|---|---|
| 1,700,837 A | 2/1929 | Reuen | |
| 1,782,272 A | 11/1930 | Power | |
| 3,456,534 A | 7/1969 | Williams | |
| 4,459,458 A * | 7/1984 | Vetsch ................. | B23P 25/003 |
| | | | 219/121.6 |
| 4,520,700 A | 6/1985 | Herzog et al. | |
| 4,852,434 A | 8/1989 | Bald | |
| 4,968,206 A * | 11/1990 | Trillwood ............... | H01J 37/18 |
| | | | 414/217 |
| 5,062,758 A * | 11/1991 | Trillwood .............. | B23K 15/06 |
| | | | 414/217 |
| 5,201,894 A * | 4/1993 | Deal ...................... | B23K 20/12 |
| | | | 228/2.3 |
| 5,333,494 A | 8/1994 | Kishima et al. | |
| 5,575,041 A | 11/1996 | Lee | |
| 5,797,605 A * | 8/1998 | Gross ...................... | B23B 23/04 |
| | | | 279/157 |
| 6,022,132 A * | 2/2000 | Schulz ............... | G05B 19/4184 |
| | | | 700/186 |
| 6,084,205 A | 7/2000 | Sheaffer et al. | |
| 6,092,446 A * | 7/2000 | Hardesty ................ | B27C 5/003 |
| | | | 142/7 |
| 8,156,850 B2 | 4/2012 | Ichikawa et al. | |
| 8,434,341 B2 * | 5/2013 | Camm ............... | H01L 21/68721 |
| | | | 269/903 |
| 8,677,869 B2 | 3/2014 | Kijima et al. | |
| 9,627,244 B2 * | 4/2017 | Camm ............... | H01L 21/68728 |
| 2002/0146295 A1 | 10/2002 | Schaer et al. | |
| 2003/0012678 A1 | 1/2003 | Sherman | |
| 2006/0011002 A1 | 1/2006 | Rashleger et al. | |
| 2006/0037444 A1 | 2/2006 | Robinson | |
| 2008/0196911 A1 | 8/2008 | Krapf et al. | |
| 2009/0151433 A1 | 6/2009 | Gao et al. | |
| 2011/0094357 A1 | 4/2011 | Wu | |
| 2013/0189041 A1 | 7/2013 | Abe et al. | |
| 2013/0330466 A1 | 12/2013 | Lochner et al. | |
| 2017/0328636 A1 | 11/2017 | Luce et al. | |
| 2017/0361380 A1 | 12/2017 | Luce et al. | |

FOREIGN PATENT DOCUMENTS

| | | |
|---|---|---|
| DE | 1602987 A1 | 4/1970 |
| DE | 2410540 A1 | 9/1975 |
| FR | 2201639 A5 | 4/1974 |
| GB | 550092 A | 12/1942 |
| GB | 2318885 A | 5/1998 |

* cited by examiner

TAIL STOCK FOR A LONG VERTICALLY SUSPENDED WORKPIECE THAT WILL EXPERIENCE HEAT EXPANSION

CROSS REFERENCE TO RELATED APPLICATION

This application is a divisional of U.S. Divisional application Ser. No. 16/556,547 filed on Aug. 30, 2019, which is a Division of U.S. application Ser. No. 15/185,541 filed Jun. 17, 2016, the disclosures of which are incorporated by reference herein in its entirety.

BACKGROUND

A tailstock may be used to support a rotating workpiece for processing. Generally, the tailstock supports the workpiece along a longitudinal rotary axis. In some cases, the workpiece is supported at a first end by a rotary tool such as a lathe head and a second, opposing end by the tailstock. In other cases, the tailstock may be employed to support the workpiece along a vertical rotary axis. During thermal processes, the workpiece may expand. Thermal expansion of the workpiece could contribute to process errors. Therefore, industrial processors would be receptive to a tailstock that accounts for thermal expansion of a workpiece.

SUMMARY

Disclosed is a method of processing a workpiece including supporting the workpiece on a tailstock extending along an axis, thermally processing the workpiece with a processing device, and displacing a portion of the tailstock assembly in response to thermal expansion of the workpiece as a result of processing with the thermal processing device.

BRIEF DESCRIPTION OF THE DRAWINGS

Referring now to the drawings wherein like elements are numbered alike in the several Figures.

DETAILED DESCRIPTION

Figure 1:
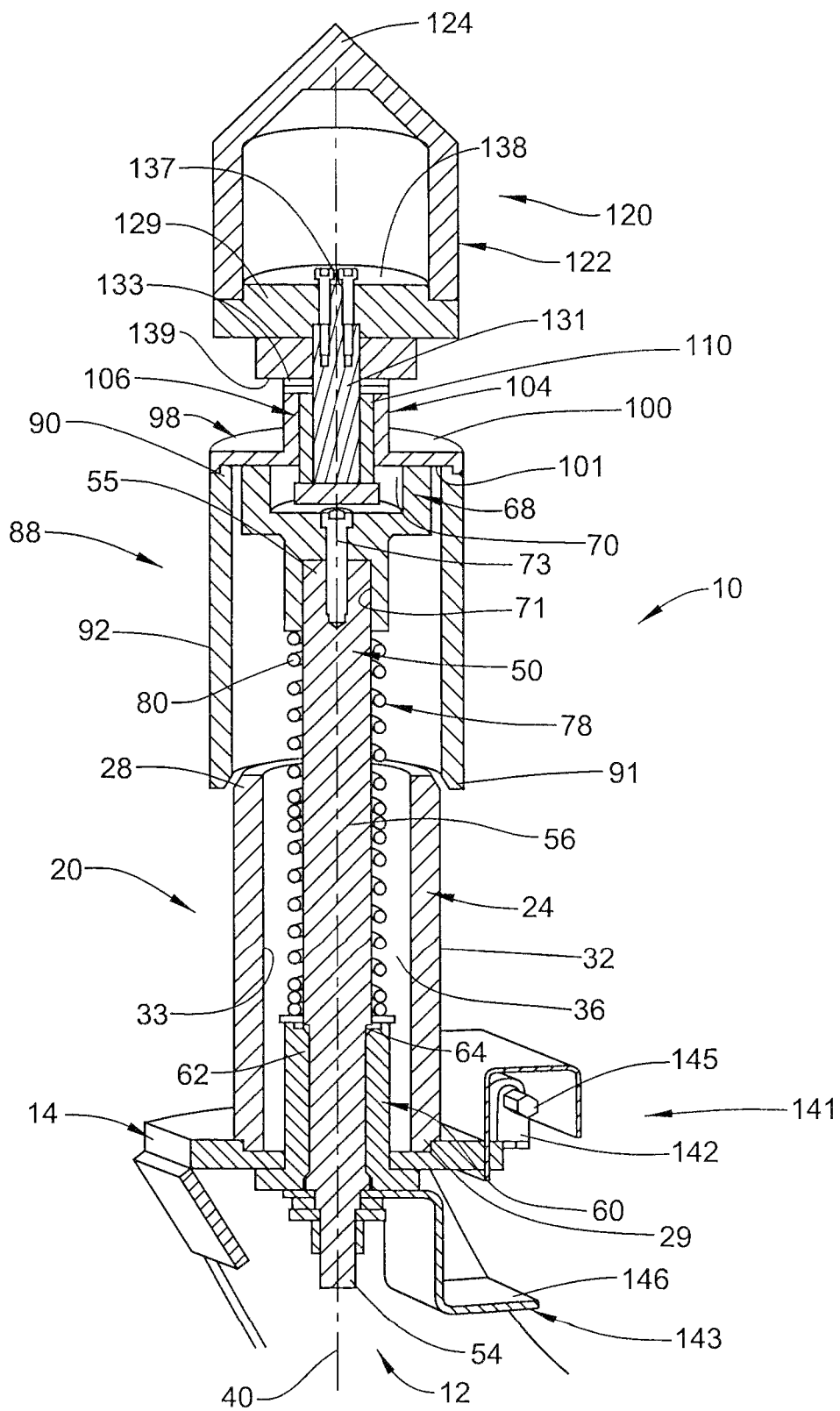
FIG. 1 depicts a partial cross-sectional side view of a tailstock assembly according to an aspect of an exemplary embodiment.
Figure 3:
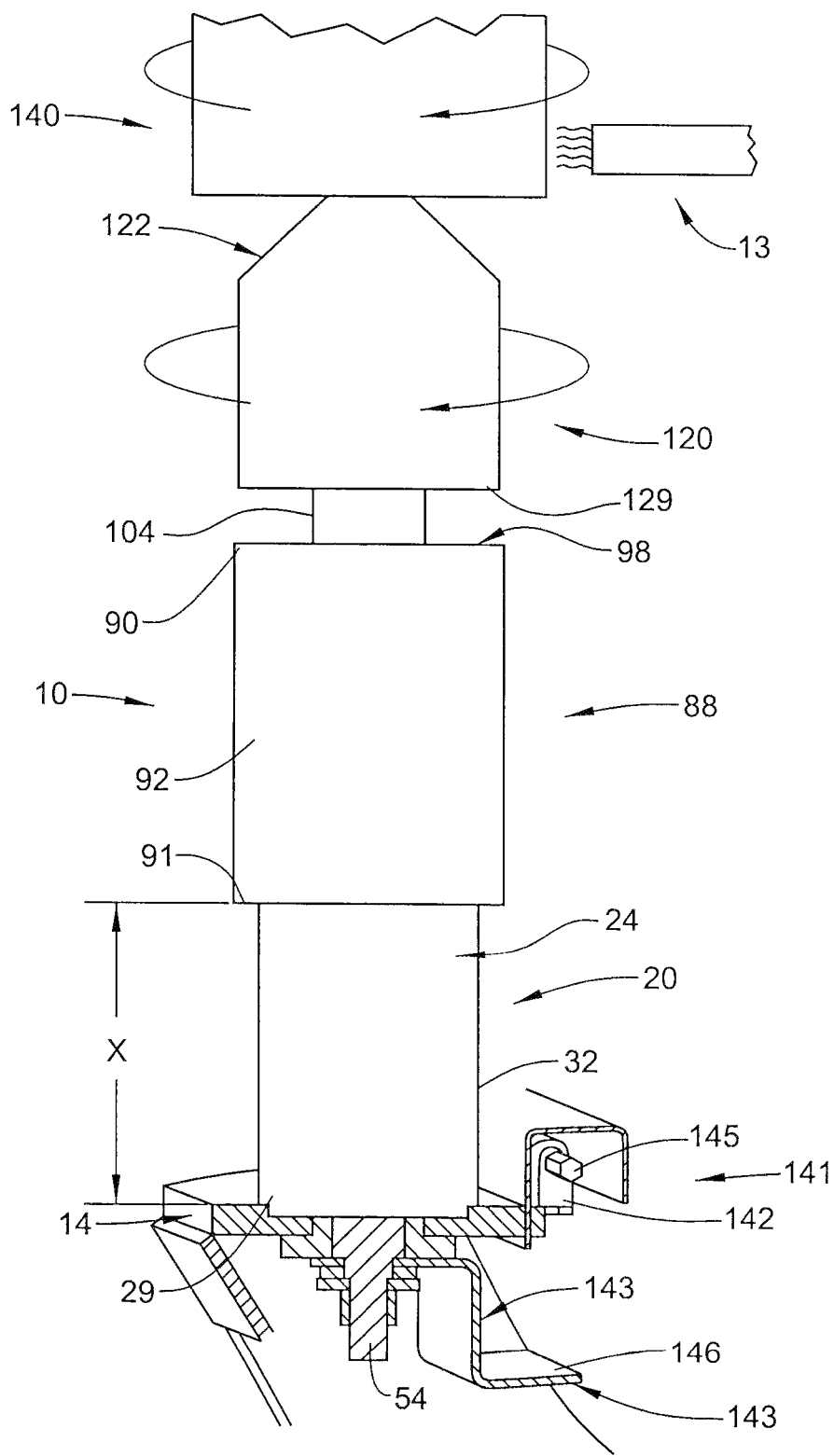
FIG. 3 depicts a partial cross-sectional side view of the tail stock assembly, in accordance with exemplary embodiments, supporting a workpiece undergoing a thermal process.

A tailstock assembly, in accordance with an aspect of an exemplary embodiment, is indicated generally at 10 in FIG. 1. Tailstock assembly 10 includes a support 12 that may be coupled to a processing device 13 (FIG. 3) that could take the form of a sintering processing device and/or a thermal spray processing device (not separately labeled). A base member 14 may be mounted to support 12. Of course, it should be understood that base member 14 and support 12 could be integrated into a single component. A housing 20 extends from base member 14. Housing 20 includes a wall 24 having a first end 28, a second end 29, an outer surface 32 and an inner surface 33 that defines a central passage 36. A longitudinal axis 40 extends through central passage 36. In the exemplary embodiment shown, longitudinal axis 40 constitutes a vertical axis.

In further accordance with an aspect of an exemplary embodiment, tailstock assembly 10 includes a workpiece support 50 arranged within central passage 36. Workpiece support 50 includes a first end 54, a second end 55 and an intermediate portion 56 extending therebetween. A linear bearing 60 is arranged at base member 14 and receives workpiece support 50. Linear bearing 60 allows for translation of workpiece support 50 along longitudinal axis 40 while constraining relative rotation. More specifically, intermediate portion 56 of workpiece support 50 may include a plurality of grooves or splines 62. Similarly, an inner surface (not separately labeled) of linear bearing 60 may include corresponding grooves or splines 64 that engage with splines 62. Interaction between splines 62 and 64 prevents, or at least substantially limits, rotation of workpiece support 50 about longitudinal axis 40.

In still further accordance with an exemplary aspect, tailstock assembly 10 includes a rotating member mount 68 arranged at second end 55 of workpiece support 50. Rotating member mount 68 includes a first recess portion 70 and a second recess portion 71 that receives second end 55. A mechanical fastener 73 secures rotating member mount 68 to workpiece support 50. A biasing member 78 extends between rotating member mount 68 and linear bearing 60. In accordance with an aspect of an exemplary embodiment, biasing member 78 takes the form of a coil spring 80 that extends about workpiece support 50. Biasing member 78 applies a biasing force to rotating member mount 68 along longitudinal axis 40 in a direction opposite to that of base member 14.

In yet still further accordance with an exemplary aspect, tailstock assembly 10 includes a shield member 88 that receives first end 28 of housing 20. Shield member 88 includes a first end portion 90, a second end portion 91 and an intermediate portion 92 extending therebetween. A cap member 98 may be coupled to first end portion 90 of shield member 88. Cap member 98 may include an opposing surface 100 and an opposing second surface 101. A hub 104 may extend outwardly of first surface 100 along longitudinal axis 40. A bearing 106 may be arranged within hub 104. In accordance with an exemplary aspect, bearing 106 may take the form of Graphalloy® sleeve or linear bearing 110. Of course, other materials may also be employed to form linear bearing 110.

In still yet further accordance with an exemplary aspect, a rotating member 120 is operatively coupled to rotating member mount 68. Rotating member 120 may take the form of a stainless steel cone 122 having a workpiece support end 124 and a base 129. A shaft 131 may be coupled to base 129 and extend through hub 104. One or more thrust washers 133 may be arranged between base 129 and hub 104. Shaft 131 may be connected to base 129 through one or more mechanical fasteners 137. Base 129 may be formed from a thermally insulating material and includes a first surface 138 and an opposing second surface 139. Base 129 may provide thermal protection to shaft 131, shield member 88, workpiece support 50, and biasing member 78 during high temperature processes such as thermal spray processes.

Rotating member 120 may rotatably support a workpiece 140 (FIG. 3) undergoing a thermal process. The workpiece may be subjected to elevated temperatures such as those during a sintering process, a thermal spray process, or other high temperature processes. As such, during processing, the workpiece may thermally expand. Tailstock assembly 10 accommodates thermal expansion of the workpiece. More specifically, as will be detailed more fully below, thermal expansion of the workpiece leads to a liner translation of workpiece support 50 and shield member 88. Thermal expansion of the workpiece may necessitate adjustments to the process.

Accordingly, tailstock assembly 10 includes a displacement sensor 141 that determines how much workpiece support 50 translates along longitudinal axis 40. In accordance with an aspect of an exemplary embodiment, displacement sensor 141 may include a stationary portion 142 and a moveable portion 143. Stationary portion 142 may take the form of a laser 145 and moveable portion 143 may take the form of a target 146. Displacement sensor 141 may be coupled to a controller (also not shown) that provides displacement data or feedback to process control computers. It is to be understood that displacement sensor 141 may also take the form of a magnetic field sensor, a linear scale, a geared servo and the like.

Figure 2:
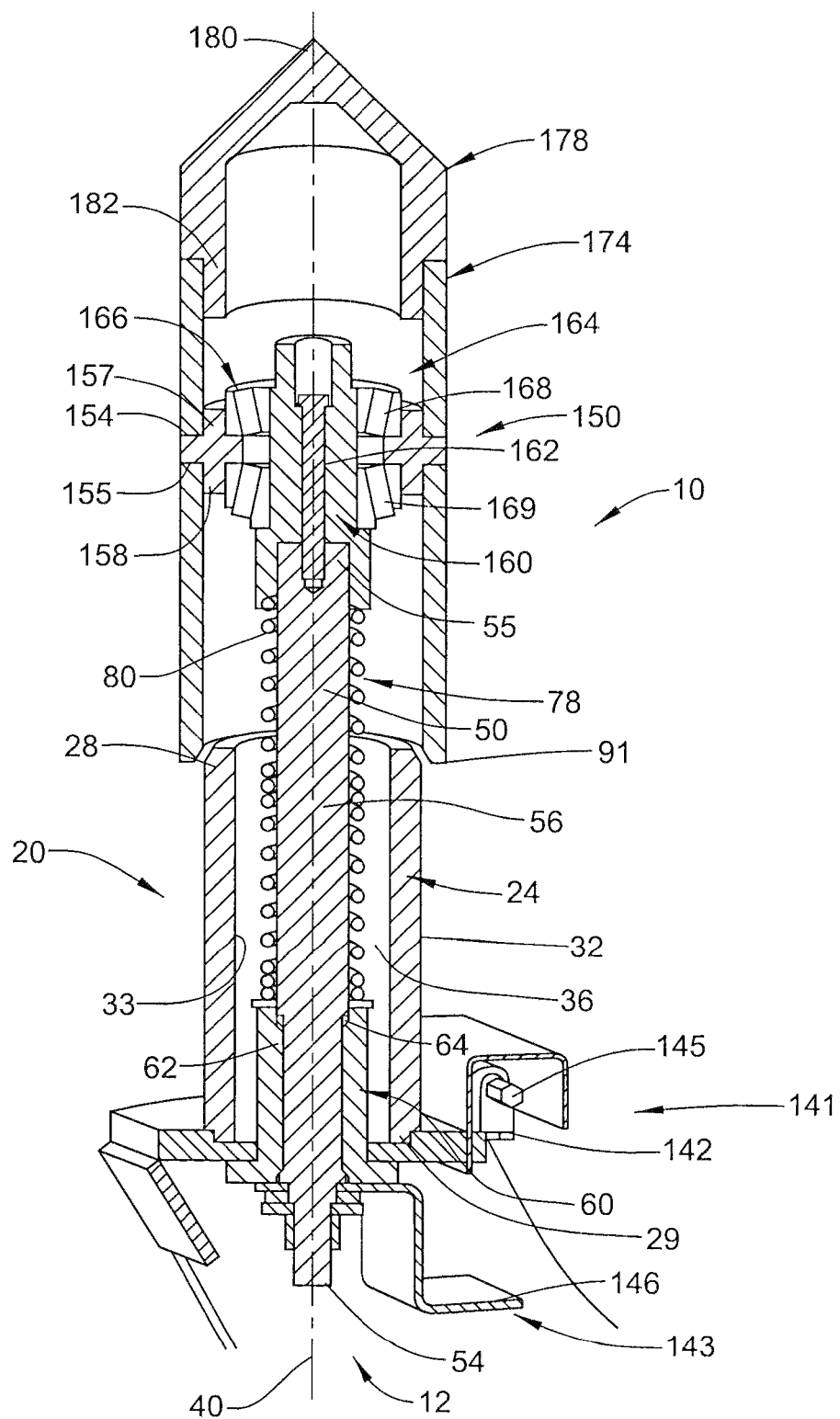
FIG. 2 depicts a partial cross-sectional side view of a tailstock assembly according to another aspect of an exemplary embodiment.

Reference will now follow to FIG. 2, wherein like reference numbers represent corresponding parts and features in the respective views in describing a cap member 150 in accordance with another aspect of an exemplary embodiment. Cap member 150 includes a first surface 154 and an opposing second surface 155. A first hub 157 extends outwardly of first surface 154 and a second hub 158 extends outwardly of second surface 155. A rotating mount member 160 is coupled to second end 55 of workpiece support 50 and extends through cap member 150. Rotating mount member 160 passes through a bearing 164 arranged in cap member 150. Bearing 164 may take the form of a tapered roller bearing 166 having a first bearing element 168 arranged in first hub 157 and a second bearing element 169 arranged in second hub 158.

In further accordance with the exemplary aspect shown, tailstock assembly 10 may include a support sleeve 174 that extends between cap member 150 and a rotating member 178. Rotating member 178 includes a workpiece support end 180 and a base 182. Rotating member 178 may rotatably support a workpiece (not shown) in a manner similar to that described above.

In accordance with an aspect of an exemplary embodiment, rotating member 120 of tailstock 10 supports workpiece 140 at processing device 13. It is to be understood that tailstock assembly 10 could support a variety of workpieces for various processes including both thermal and non-thermal related processes. A device (not shown) rotates workpiece 140. Rotation of workpiece 140 may be imparted to rotating member 120. It is to be understood that workpiece support 50 is isolated from the rotation of workpiece 140 and rotating member 120. It is also to be understood that workpiece 140 could be mounted to rotating member 150. At a start of processing, workpiece support 50 and shield member 88 are in a first position shown in FIG. 3.

Figure 4:
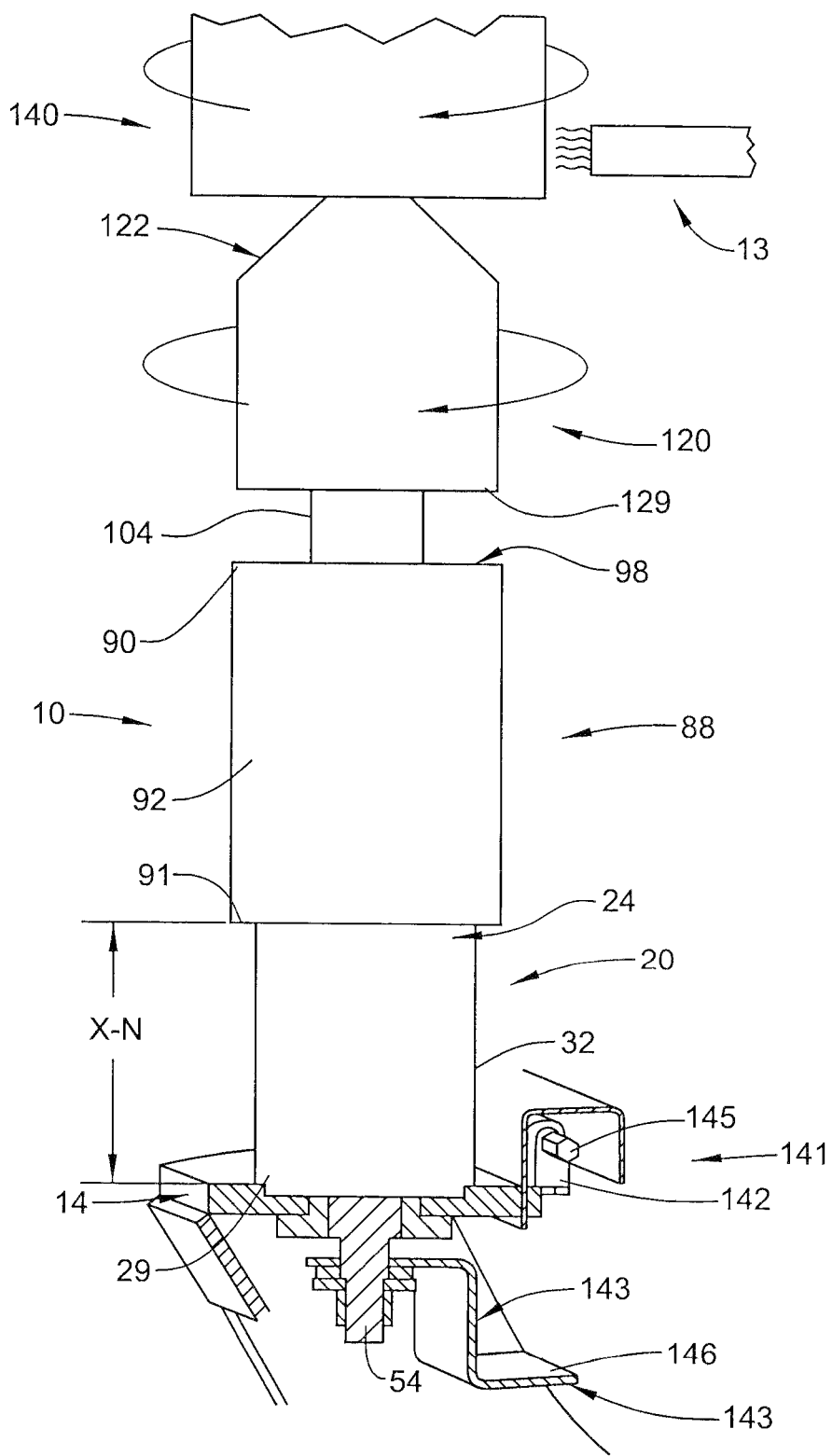
FIG. 4 depicts a partial cross-sectional side view of the tail stock assembly of FIG. 3 following a vertical displacement caused by thermal expansion of the workpiece.

During processing, workpiece 140 may expand due to exposure to heat generated by processing device 13. As a result of the expansion of workpiece 14, workpiece support 50 may translate along vertical axis 40 as shown in FIG. 4. Translation of workpiece support 50 may include a corresponding translation of shield member 88. Displacement sensor 141 determines an amount of translation by measuring movement of, for example, target 146. The amount of translation sensed by displacement sensor 141 may be provided to a control system (not shown) or an operator (also not shown) that shifts processing device 13 a corresponding distance to continue processing workpiece 140.

In accordance with another aspect, workpiece 140 may be supported on workpiece support 120 with a pre-load on biasing member 78. Temperature sensors may be employed to determine a temperature of workpiece 140 and adjustments may be made to compressive forces applied to biasing member 78 to account for dimensional changes.

Workpiece 140 may vary in diameter from about 2-inches (5.08-cm) to about 12-inches (30.48-cm) and may have a length from about 3-feet (0.914-meters) to about 30-feet (9.14-metres). During processing workpiece 140 is rotated at a desired RPM. The desired RPM may be limited by a stability of workpiece 140 as well as process requirements. In order to reduce or prevent part or component bending causing both off center and unstable rotation a system which allows consistent and controlled pressure on workpiece 140 is desired. A heat intensive process may lead to an effective length and diameter change of workpiece 140. If a fixed or a spring loaded mechanism were used the process would not be capable of maintaining a consistent controlled pressure within the range of pressures that would not cause workpiece 140 to bend creating unstable off center rotation. Additionally, a fixed or a spring loaded mechanism may not be capable of maintaining a desired pressure to retain or support workpiece 140. This appropriate range of forces acting to compress workpiece 140 may also be dependent upon composition, length, and temperature.

Tailstock 10, in accordance with an exemplary embodiment, may be employed in a processing system where a specific rotational velocity were desired outside of range capable of being supported by spring loaded or fixed systems. As workpiece 140 is heated or heat is an inherent result of processing, tailstock 10 adjusts a location of spring datum to align to an ideal pressure allowing rotation at higher speeds as well as conform to processing parameters and requirements.

Set forth below are some embodiments of the foregoing disclosure:

Embodiment 1. A method of processing a workpiece including supporting the workpiece on a tailstock extending along an axis, thermally processing the workpiece with a processing device, and displacing a portion of the tailstock assembly in response to thermal expansion of the workpiece as a result of processing with the thermal processing device.

Embodiment 2. The method according to any prior embodiment, wherein supporting the workpiece includes mounting the workpiece on a rotating member coupled to a workpiece support.

Embodiment 3. The method according to any prior embodiment, wherein displacing the portion of the workpiece includes shifting the workpiece support.

Embodiment 4. The method according to any prior embodiment, further comprises measuring, while thermally processing, an amount of displacement of the workpiece with a displacement sensor.

Embodiment 5. The method according to any prior embodiment, wherein measuring the amount of displacement of the workpiece with the displacement sensor include detecting a change in relative position between a stationery portion of the displacement sensor and a moveable portion of the displacement sensor.

Embodiment 6. The method according to any prior embodiment, wherein detecting a change in relative position includes directing a laser displacement sensor mounted to the housing at a target mounted to the workpiece support.

Embodiment 7. The method according to any prior embodiment, further comprising displacing the processing device an amount corresponding to an amount of thermal expansion of the workpiece.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A method of processing a workpiece comprising:
   supporting the workpiece on a tailstock extending along a vertical axis;
   thermally processing the workpiece with a processing device; and
   displacing a portion of the tailstock assembly in response to thermal expansion of the workpiece as a result of processing with the thermal processing device, the portion of the tailstock assembly being displaced by an amount corresponding to an amount of the thermal expansion of the workpiece resulting from processing with the thermal processing device.

2. The method of claim 1, wherein supporting the workpiece includes mounting the workpiece on a rotating member coupled to a workpiece support.

3. The method of claim 1, wherein displacing the portion of the workpiece includes shifting the workpiece support.

4. The method of claim 3, further comprising: measuring, while thermally processing, an amount of displacement of the workpiece along the longitudinal axis with a displacement sensor.

5. The method of claim 4, wherein measuring the amount of displacement of the workpiece with the displacement sensor includes detecting a change in relative position between a stationery portion of the displacement sensor and a moveable portion of the displacement sensor.

6. The method of claim 5, wherein detecting a change in relative position includes directing a laser displacement sensor mounted to the housing at a target mounted to the workpiece support.

7. The method of claim 1, further comprising: displacing the processing device an amount corresponding to an amount of thermal expansion of the workpiece.

* * * * *